April 7, 1964 E. W. ROBERTSON 3,127,916
DELAYED ACTION REGULATOR FOR BUFFER
Filed Jan. 23, 1961 2 Sheets-Sheet 2
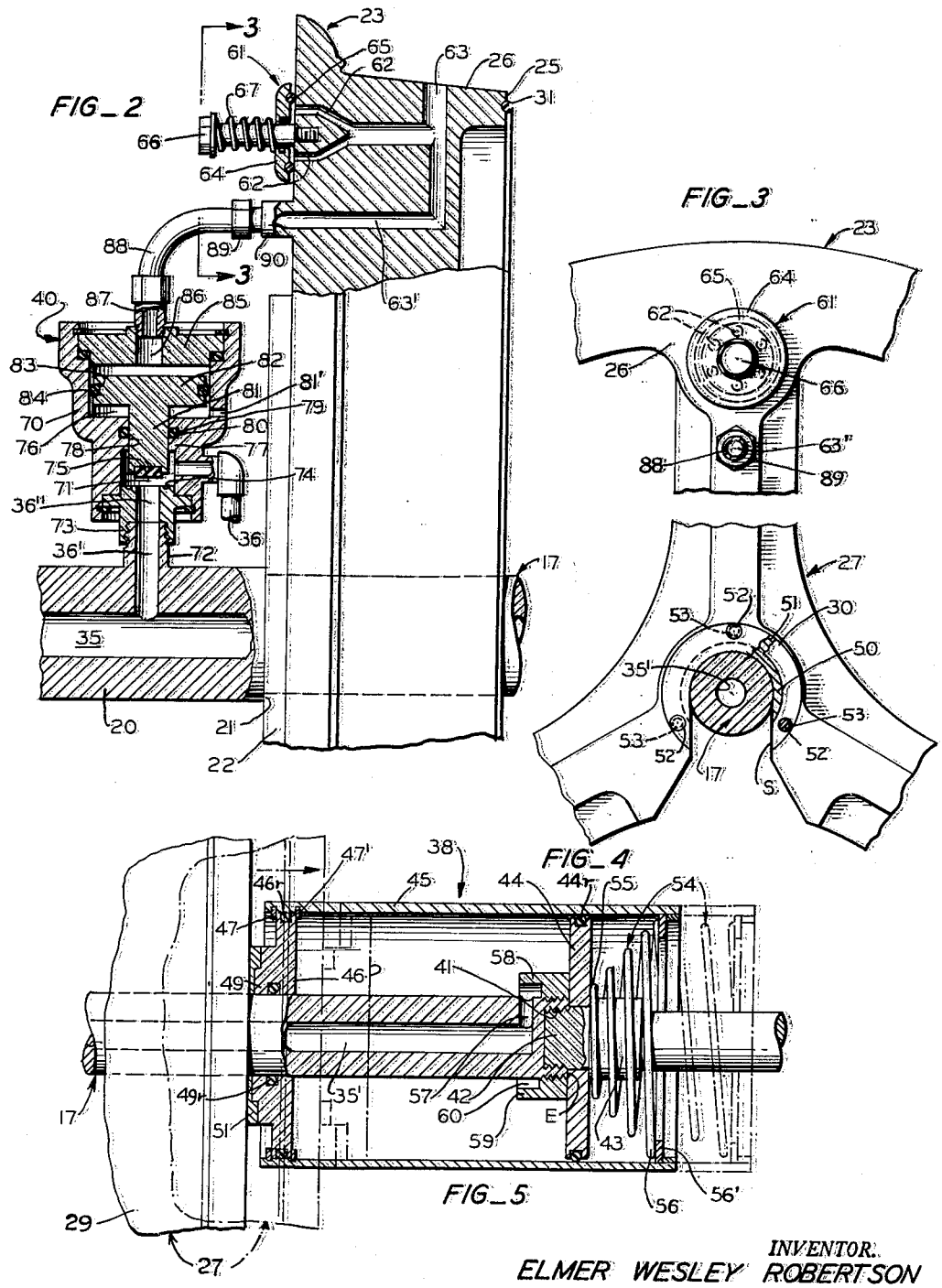
INVENTOR.
ELMER WESLEY ROBERTSON
BY
Hansen and Lane
HIS ATTORNEYS

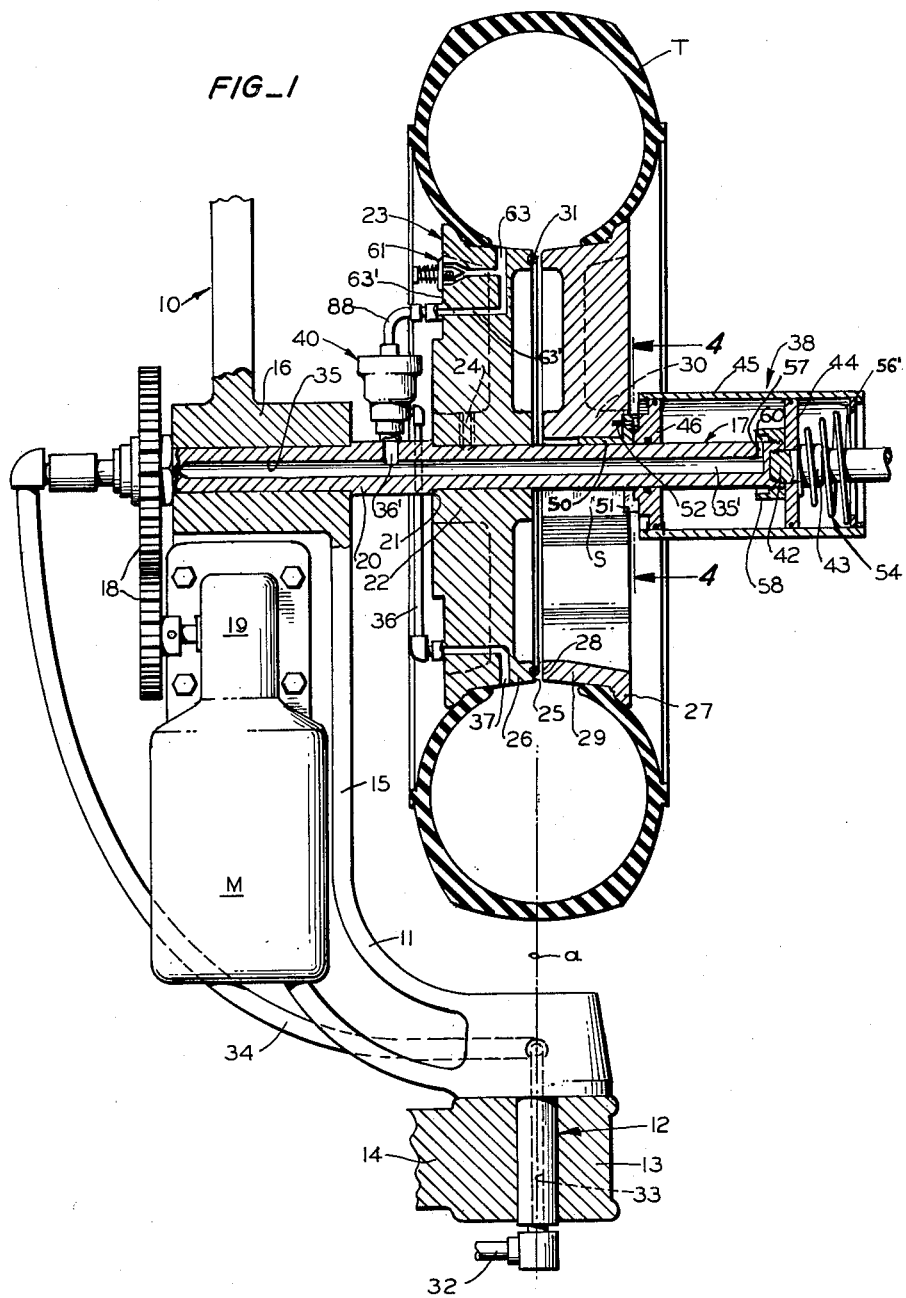

United States Patent Office 3,127,916
Patented Apr. 7, 1964

3,127,916
DELAYED ACTION REGULATOR FOR BUFFER
Elmer Wesley Robertson, Berkeley, Calif., assignor, by mesne assignments, to Elrick Industries, Inc., Oakland, Calif.
Filed Jan. 23, 1961, Ser. No. 84,443
5 Claims. (Cl. 144—288)

This invention relates to tire supporting and treating equipment and more particularly to a tire mount and tire pressuring means and to pressure regulating means for the same.

The present invention is particularly adapted for application in machines of the type disclosed in United States Letters Patent No. 2,872,978 which issued February 10, 1959 to John W. Bakke and in United States Patent No. 2,992,675 on an application Serial No. 684,-211 filed September 16, 1957 by the same inventor from whom my assignee possesses an exclusive license to manufacture and sell such devices. The invention relates to any type of equipment in which a tire is supported in inflated condition for treatment such as buffing or for working on the tire or for testing the same.

It is an object of the present invention to provide pneumatic means for maintaining a split rim tire mount in tire supporting position.

It is another object of this invention to coordinate the means for pneumatically securing the rim halves of a split rim tire mount in tire supporting position with the tire inflating system embodied in the tire mount. In this connection the rim halves are arranged on a rotatable spindle having air passages therein communicating with the tire cavity and interrelated with means on said spindle effected by pressurized air for pressing the rim halves into tire supporting position.

It is yet another object to provide a regulator between the tire inflating system and the pneumatic means on the spindle for delaying the tire inflating phase until after the rim securing means has been operated.

These and other objects and advantages of the present invention will become more apparent from a reading of the following description in the light of the accompanying drawings in which:

FIG. 1 is a section through the spindle and tire mount embodying the present invention.

FIG. 2 is an enlarged detail of a quadrant of FIG. 1, part of which is in section and part in elevation.

FIG. 3 is a fragmentary elevation as seen from line 3—3 in FIG. 2.

FIG. 4 is a fragmentary elevation as seen from line 4—4 in FIG. 1.

FIG. 5 is an enlarged section through the rim securing means at the outer end of the spindle as seen in FIG. 1.

In general the present invention has its environment in a tire buffer 10 in which a half U or J shaped support arm 11 has its lower end swivelly mounted as at 12 on one end 13 of a swing arm 14 for the purpose of accomplishnig 360° rotation of the entire tire mount relative to a buffing wheel on a stationary arbor all of which is well known in the art as evidenced in the aforementioned Bakke patent.

The upper end 15 of the vertical portion of the support arm 11 has a horizontally disposed bushing or bearing 16 in which a spindle 17 is journaled for rotation. This spindle 17 has one end drivingly connected, either directly or by way of a gear train 18, as shown, to a powered means 19 in the form of an electric motor M supported on the arm 11 so as to swing therewith.

The opposite end of the spindle 17 extends horizontally and transversely of the vertical axis —a— about which the support arm 11 swivels at 12 on the swing arms previously mentioned. The spindle 17 has an enlarged portion 20 adjacent the bushing 16 providing a shoulder 21 against which the hub 22 of one half rim 23 abuts for maintaining the latter in spaced relation to the support arm 11. The half rim 23, hereinafter referred to as the fixed half rim, is secured by a set screw 24 to the spindle 17 so as to rotate therewith. The fixed half rim 23 has an inner face 25 on its annular flange 26 disposed in a plane through which the aforementioned axis —a—, if extended vertically, is diametrically disposed. A demountable half rim 27 is adapted to be disposed on the spindle 17 with the inner face 28 of its flange 29 adapted for abutting relation with the inner face 25 of the fixed half rim 23. The demountability of the half rim 27 is accomplished by providing the hub 30 thereof with radial slot S having sliding fit with the spindle 17 whereby to facilitate mounting and demounting of the half rim 27 laterally of the spindle without necessitating a complete removal of the rim securing means from the spindle all as described and claimed in the aforementioned Bakke Patent No. 2,872,-978.

Means 31 for providing a seal between the abutting faces 25 and 28 of these two half rims consist of a neoprene or rubber ring embedded halfway into and secured on the face 25 of the flange 26 of the fixed half rim 23. Heretofore means for pressing the demountable half rim 27 toward the fixed half rim 23 consisted of a screw thread on the free end of the spindle and a wing nut or like means threadedly connected to the spindle. The means 38 for accomplishing this purpose in the present invention is of the pneumatic type as will become apparent in the following description.

As to the prior known construction of this type of buffing equipment, means for inflating a tire supported upon the half rims 23 and 27 consisted of an air supply hose or conduit 32 communicating with an air passage 33 formed through the swivel mount 12 co-axially of the axis —a— thereof for transmitting air under pressure to the swivel arm 11. A hose or conduit 34 having one end communicating with the upper end of the passage 33 on the swivel arm 11 has its opposite end communicating with an axial air passage 35 formed in the supported end of the spindle 17. As disclosed in the aforementioned Bakke patent and application an air hose 36 has one of its ends communicating with a radial passage 36' leading from the axial passage 35 in the spindle 17 and its opposite end communicating with a passage 37 formed in the spoke and/or flange 26 of the fixed half rim 23 so as to direct air under pressure directly into the cavity of the tire mounted on the half rims 23—27 during rotation thereof.

Having thus explained the prior known construction I shall now proceed to describe the improvements thereof as contemplated by the present invention.

In accordance with the present invention the means 38 for pressing the demountable rim 27 toward the fixed rim 23 comprises a pneumatic means coordinated with a delayed action regulator 40 in the air line 36 via which air under pressure is admitted into the tire T from the axial passage 35 formed in the spindle 17. The construction is as follows:

The spindle 17 is long enough to allow the demountable rim 27 to be shifted axially a distance to clear the tire T when the latter is in a collapsed condition so as to facilitate removal of the rim 27 from the spindle by withdrawing it laterally via the slot S as previously explained. Referring to FIG. 5 the free end of the spindle has a threaded recess 41 formed at its extremity for receiving a screw plug 42 having an enlarged shoulder collar portion 43 formed thereon. A fixed disc diaphragm 44 mounted on the screw plug 42 is secured against the extreme end E of the spindle 17 by the shoulder collar 43 when the screw plug is tightened threadedly into the threaded recess 41.

A cylinder 45 is mounted on the periphery of the disc diaphragm 44 for sliding movement axially thereof and relative to the spindle 17. A sealing ring 44r carried by the disc diaphragm 44 has air tight sealing engagement with the internal wall of the cylinder 45. The inner end of the cylinder 45 has an end wall 46 which is secured in place by a pair of expansion rings 47—47' which embrace the end wall 46 and expand into corresponding annular grooves formed on the inside face of the cylinder 45 adjacent its inner end. The hub portion 49 of this end wall 46 slides upon the spindle 17 and being fixed to the cylinder 45 forms an aligning guide for the cylinder 45 as it slides axially over the periphery of the fixed disc diaphragm 44. The end wall 46 therefore serves as a piston which moves the cylinder 45 relative to the fixed disc diaphragm 44.

Suitable sealing rings, one 46r at the periphery of the end wall 46 and the other 49r between the hub 49 and the spindle 17, assure an air tight seal at these two positions.

As best seen in FIGS. 4 and 5 there is a partial bushing 50 which fits within the open center of the hub 30 of the demountable rim 27. The slot S in hub 30 is of a width plus clearance to fit over the spindle 17, the collar 50 being slotted to fit upon the spindle and to center the rim 27 upon the spindle 17. The collar 50 has an enlarged outer flange 51 which fits into a recess of conforming shape formed in the face of the hub 30. The flange 51 being more than 180° in circumference locks itself in the conforming recess in the hub. The flange 51 is provided with studs 52 which fit key-like into the three holes 53 formed in the hub 30 (see FIG. 4) at the base of the conforming recess.

The end wall 46 of the pneumatic means 38 is adapted to bear against the outer face of the collar 50 and hub 30 but normally is retracted outwardly of the spindle by a helical compression spring 54 which retracts the entire cylinder 45 and its end wall 46 outwardly along the spindle 17. This spring 54 has a small convoluted end 55 disposed to bear against the fixed diaphragm 44 and an opposite larger convoluted end 56 bearing against an inturned flange 56' secured to the open outer end of the cylinder 45. Thus it will be seen that the spring 54 in expanding normally tends to release the end wall from bearing toward the demountable rim 27 to facilitate removal of the latter from the spindle 17.

It should here be noted that the free end E of the spindle 17 also has an outside thread upon which a nut 58 is secured in abutting relation to the fixed disc or diaphragm 44. This nut has an annular flange 59 which projects inwardly, i.e., toward the half rims so as to limit outward movement of the end wall 46 and therefore the cylinder 45 under the influence of the spring 54 as the end wall 46 abuts this annular flange 59. The annular flange being of larger diameter than the spindle provides an annular recess or gateway 60 between the flange 59 and the spindle 17 for admitting air under pressure into the cylinder 45.

In further contemplation of the present invention the axial passage 35 is extended as at 35' outwardly of the spindle 17 beyond the radial passage 36' which feeds air to the tire T via hose 36. This extension 35' of the axial passage 35 terminates at a radial port 57 which feeds into the confines of the annular flange 59 or gateway recess 60 previously mentioned. Consequently, when the usual control valve is opened to admit air via hose 32 and into the axial passage 35 the first charge of air immediately surges straight through the extension 35' and via port 57 into the cylinder 45. The air which is coming in at, say 150 pounds per square inch, bears against the end wall 46, the fixed diaphragm 44 acting as a piston. This forces the end wall 46 and the cylinder 45 inwardly along the spindle against the action of the compression spring 54. In this manner the end wall 46 bears against flange 51 of collar 50 and it against the hub 30 of the demountable rim 27 to force the latter inwardly along spindle 17. This forces rim 27 into a position in which the inner face 28 of the flange 29 on rim 27 bears against the sealing ring 31 on the inner face 25 of the other rim half 23. Thus it will be seen that the tire T is firmly mounted on the flanges of the two rim halves 23 and 27 between the rim beads thereof.

When the half rims 23 and 27 are thus pressed against each other with tire T thereon the end wall 46 ceases to move inwardly thus bottling up air pressure within the cylinder 45 and the extended end 35' of the passage 35. The tire T is now firmly mounted on the joined half rims 23—27 so that the air admitted via air hose 36 and passage 37 into the tire cavity will inflate the tire.

As previously stated the air entering the passage 35 is compressed to 150 pounds per square inch. For safety sake it has been found advisable not to inflate the tire so mounted beyond a pressure sufficient to brace the tire during the buffing operation. A pressure of 5 pounds per square inch has been found to be sufficient for this purpose. Likewise pressure within the tire exceeding 12 pounds per square inch may unduly strain the half rims and is likely to exert undue stresses on the tire supporting frame. Consequently it has become a requirement to provide the device with a blow off safety valve 61 such as is illustrated in FIGS. 2 and 3. This involves a series of exit ports 62 formed in the flange 26 of the fixed half rim 23 as branches of a main port 63 communicating with the cavity of the tire T so as to discharge air therefrom. These exit ports 62 are covered by a cap 64 having a ring seal 65 thereon which circumscribes the exit ports as they are arranged at the outer face of the fixed rim 23. The cap 64 is mounted for sliding movement axially of a stud bolt 66 secured to the half rim 23 concentrically of the several exit ports. A compression spring 67 is mounted on the shank of the stud bolt 66 between the hex head thereof and the cap 64 for urging the latter toward the outer face of the half rim 23. The spring 67 has the capacity of withstanding air pressure up to 12 pounds per square inch but not over so as to relieve the pressure within the tire before it reaches a point of danger.

Now it will be appreciated that the air seal between the rim beads of the tire and the tire bead engaging flanges on the half rims 23 and 27 is such that a certain amount of air under pressure may escape if the pressure within the tire is appreciably beyond the allowable or required limit (5 pounds per square inch). The same may be true of the seal 31 between the half rims 23 and 27 themselves.

Consequently in carrying out the objects of the present invention in assuring that the pressure within the tire casing T be maintained at a safe level (5 pounds per square inch) other than by a constant flow of air under the usual pressure (150 pounds per square inch) from the source of supply, the delayed action regulator 40 between the air supply passage 35 and the cavity of the tire T is provided.

This delayed action regulator 40 is interposed in the air line 36 and is operatively associated with the pressure prevailing within the tire cavity. As best seen in FIG. 2 the regulator 40 comprises a body 70 having a small chamber 71 interposed in the air line 36. In other words, the flow of air from the supply passage 35 via the radial passage 36' therefrom communicates with the small chamber 71 and the latter with the air line 36. Structurally, the radial passage 36' is formed through a pipe stem 72 extending radially from the spindle 17. A base fitting 73 on the body 70 is threadedly connected to the threaded end of the pipe stem 72 so as to rotate with the latter as the spindle 17 turns. This base fitting 73 has a passage 36" formed axially thereof in alignment with the radial passage 36' in the pipe stem 72. The upper end of the base fitting 73 which is disposed within the chamber 71 has a valve seat 74 formed thereon against which a valve pad 75 is adapted to press, in a manner later to be explained, in order to shut off the flow of air under pressure from the supply passage 35 into the small chamber 71 via the radial passages 36'—36".

The regulator body 70 also has a large chamber 76 formed therein in axial alignment with the small chamber 71 and separated therefrom by a medial partition 77 formed integrally with the main body casting. The partition 77 has a passage 78 formed therethrough co-axially of both small and large chambers. The wall of this passage 78 has an annular recess 79 formed therein in which an O ring 80 is seated for bearing and sealing engagement with a slide stem 81 formed as a part of a piston 82 disposed in the large chamber 76. This piston 82 has an annular piston ring receiving recess 83 formed therein in which a piston ring 84 is seated for bearing and sliding engagement with the internal wall of the chamber 76. It will thus be seen that the slide stem and piston 81—82 are arranged for sliding movement as a unit axially of the main body 70 of the regulator 40.

The free end of the main body 70 has an end wall 85 secured thereto for closing the open end of the large chamber 76. This end wall 85 has an axial port 86 into which a nipple 87 is threaded, the nipple having sealed connection with one end of a conduit 88 in the form of an elbow. The opposite end of the conduit 88 is secured to a coupling 89 which is threadedly secured to a stem 90 formed on the fixed half rim 23 to communicate the conduit 88 with a passage 63' which merges with the main port 63 formed in the flange 26 of the half rim 23. From this it will be seen that the outer end of the large chamber 76 is in direct and constant communication with the cavity of the tire T so that the piston 82 is at all times subjected to the air pressure prevailing therein. It should also be noted that the end of the slide stem 81 disposed in the small chamber 71 is at all times subjected to the air pressure prevailing in the air supply passage 35 via the radial passages 36'—36" leading therefrom.

Now since the air pressure prevailing in the air supply passage 35 is constantly maintained at approximately 150 pounds per square inch and the cavity of the tire, at the outset is at normal or atmospheric pressure, it will be appreciated that the slide stem 81 and piston 82 as a unit will be forced outwardly relative to the main body 70 of the regulator 40. Consequently, when the incoming air pressure has forced the cylinder 45 and its end wall 46 firmly against the demountable half rim 27 in the manner already explained, the air supply entering the small chamber 71 will exit therefrom via the hose 36 and passage 37 into the cavity of the tire T. As the air pressure within the tire builds up to the minimum requirement for buffing purposes, namely 5 pounds per square inch, this same pressure is immediately transmitted to the outer end of the large chamber 76 and thereby impressed upon the piston 82.

Now here it should be noted that the portion of the piston 82 subjected to the air pressure prevailing within the tire is much greater in area than that portion of the slide stem 81 which is subjected to the air supply pressure. For example, assuming the piston diameter to be 1¾ inches or 2.4053 square inches which when subjected to a pressure of 5 pounds per square inch receives a force of 12.0265 pounds. Contrast this with the stem diameter of say 5/16 inch or .0767 square inches which when subjected to a pressure of 150 pounds per square inch receives a force of 11.505 pounds. This differential in force on opposite ends of the piston is sufficient to force the piston 82 toward the partition 77, the portion of the chamber 81 below the piston being vented via an aperture 81' formed through the body 70 just above the partition 77 therein.

It should here be noted that the valve pad 75 which was previously mentioned is mounted on and secured to the exposed end of the slide stem 81 within the small chamber 71. This pad 75 is therefore pressed down upon the valve seat 74 when the piston 82 is subjected to pressures above 5 pounds per square inch. Thus it will be seen that when the pressure of the air within the tire cavity reaches the minimum requirement for buffing (5 pounds per square inch) further admission of air under pressure into the small chamber 71 is shut off. However, should the air pressure within the tire fall below the minimum requirement the differential in forces against the piston and slide stem will reverse and the air supply pressure (150 pounds per square inch) which is constant will force the pad 75 off of the valve seat 74 to again admit air into the tire cavity until the pressure prevailing therein is such, when bearing upon the piston to overcome the force of the air acting upon the end of the slide stem 81. In this manner the air pressure within the tire will be maintained at the minimum limit for buffing and well below the safe maximum limit during buffing of the tire. More important, however, the escapement of air from the tire cavity at the rim bead and between the half rims will be minimized thus avoiding the nuisance of air blasts spraying rubber dust about the machine.

When the buffing operation is completed the operator, after shutting off power to the motor M, need merely shut off the valve which controls the supply of air under pressure to the passage 35 in the spindle. When this is done the air pressure prevailing within the axial passages 35 and 35' drops with a resultant drop in pressure within the cylinder 45. Thereafter the compression spring 54 is no longer overcome by the pressure of the air against the end wall diaphragm 46. Consequently the compression spring 54 expands and shifts the cylinder 45 and with it the end wall 46 outwardly along the spindle 17 thus releasing the demountable rim half 27 for outward movement therealong.

Once the half rim 27 is released the air within the tire cavity forces the half rims apart thereby decompressing the tire and shifting the demountable half rim 27 away from the fixed rim half 23. The buffed tire can now be easily removed from the tire mount and another tire placed thereon preparatory to a new buffing operation.

While I have described my new structure for delayed action regulator for buffer in specific detail it will be appreciated by those skilled in the art that the same is susceptible to modification, alteration and/or variation without departing from the spirit of my invention. I, therefore, desire to avail myself of all modifications, alterations and/or variations as fairly come within the purview of the appended claims.

What I claim as new and desire to protect by Letters Patent is:

1. In a tire mounting assembly on a rotary spindle for supporting a split rim providing rim halves upon which a tire is mounted, such spindle having an axial passage communicating with a source of air supplied at high pressure and a conduit communicating said axial passage with a tire mounted on said rim halves for inflating said tire; means coordinated with said source of air supply for urging said rim halves toward each other for supporting said tire thereon comprising pneumatic means on said spindle having a piston engageable with one of said wheel halves, and means communicating said axial passage in said spindle with said pneumatic means for urging said piston toward said one of said wheel halves by air supplied thereto at said high pressure, and a delayed action regulator including a normally open air actuated valve in said conduit for admitting air into the cavity of said tire from said source of air at high pressure, and means communicating one side of said air actuated valve with the interior of said tire for closing said air actuated valve when the air within the tire reaches a predetermined pressure less than that of said source of air at high pressure.

2. In a split rim tire mounting assembly on a rotary spindle for supporting rim halves upon which a tire is mounted, such spindle having an axial passage communicating with a source of air supplied under pressure and a conduit communicating said axial passage with a tire mounted on said rim halves for inflating said tire; means coordinated with said source of air supply for urging said rim halves toward each other for supporting said tire thereon comprising pneumatic means on said spindle having a piston engageable with one of said rim halves, and means communicating said axial passage in said spindle with said pneumatic means for urging said piston toward said one of said rim halves for moving the latter into tire supporting engagement with the other one of said rim halves, and a delayed action regulator comprising a body providing a large and a small chamber divided by a medial partition, said small chamber being interposed in said conduit, said large chamber having direct communication with the air pressure prevailing within said tire, and a floating piston in said large chamber having a slide stem of reduced diameter guided for sliding movement through sad medial partition whereby to subject the terminal end of said slide stem to the air under pressure prevailing within said small chamber, and a valve seat engageable by the terminal end of said slide stem when the air under pressure applied to said piston exceeds a predetermined pressure for closing said conduit.

3. In a split rim tire mount of the type including a pair of half rims one of which is axially movable toward the other fixed on a rotary spindle having an axial passage communicating with a source of air supplied under pressure and an air line between said axial passage and said fixed rim for supplying air under pressure to a tire mounted on said half rims; means coordinated with said air supply for urging said half rims into tire supporting condition comprising pneumatic means on said rotary spindle operatively associated with said movable half rim and communicating with the axial passage in said spindle for urging said movable half rim into sealed engagement with said fixed half rim, an air regulator including a small air chamber interposed in said air line, an isolated air chamber communicating with the interior of said tire and the air pressure prevailing therein, a floating piston in said isolated air chamber having a slide stem extending into said small air chamber, and a valve seat at the entrance of said air line into said small chamber engageable by the terminal end of said slide stem when the air pressure acting upon said piston exceeds a predetermined limit for closing said valve.

4. In a split rim tire mounting assembly on a rotary spindle for supporting half rims upon which a tire is mounted, such spindle having an axial passage communicating with a source of air under pressure and a conduit communicating said axial passage with the tire for inflating the same; means coordinated with said air supply passage for urging said half rims into tire supporting condition relative to said spindle comprising means for securing one of said half rims to said spindle, the other half rim being demountable relative to said spindle and shiftable lengthwise thereof, a gasket between said half rims adapted to provide an air seal between said half rims upon pressure of said shiftable half rim toward the half rim secured to said spindle, pneumatic means on said spindle for urging said shiftable half rim toward the other one of said half rims upon inflation of a tire mounted on said half rims, means communicating said axial passage in said spindle with said pneumatic means, and a delayed action regulator including a normally open air actuated valve interposed in said conduit, an isolated air chamber in said regulator, one side of said air actuated valve extending into said isolated air chamber, and means communicating said isolated air chamber with the interior of said tire for urging said air actuated valve into closed condition when the air within said tire reaches a predetermined limit to thereby restrain admittance of air into said tire via said conduit until the prevailing pressure of air within said tire drops below said predetermined limit.

5. In a split rim tire mounting assembly on a rotary spindle for supporting half rims upon which a tire is mounted, such spindle having an axial passage communicating with a source of air under pressure and a conduit communicating said axial passage with the tire for inflating the same; means coordinated with said air supply passage for urging said half rims into tire supporting condition relative to said spindle comprising means for securing one of said half rims to said spindle, the other half rim being demountable relative to said spindle and shiftable lengthwise thereof, a gasket between said half rims adapted to provide an air seal between said half rims upon pressure of said shiftable half wheel toward said the half rim secured to said spindle, pneumatic means on said spindle for urging said shiftable half rim toward the other one of said half rims upon inflation of a tire mounted on said half rims, and means communicating said axial passage in said spindle with said pneumatic means, a delayed action regulator comprising a body providing a large and a small chamber divided by a medial partition, said small chamber being interposed in said conduit, said large chamber having direct communication with the air pressure prevailing within said tire, and a floating piston in said large chamber having a slide stem of reduced diameter guided for sliding movement through said medial partition whereby the terminal end of said slide stem is subjected to the air under pressure prevailing within said small chamber and said conduit, and a valve seat engageable by the terminal end of said slide stem when the air under pressure applied to said piston within said large chamber exceeds a predetermined limit for closing said conduit and obstructing flow of air to said tire until the prevailing pressure therein drops below said predetermined limit.

References Cited in the file of this patent
UNITED STATES PATENTS

| | | |
|---|---|---|
| 762,274 | Bourseau | June 14, 1904 |
| 2,065,644 | Bristol | Dec. 29, 1936 |
| 2,416,195 | Mitchell | Feb. 18, 1947 |
| 2,634,784 | Fitch | Apr. 14, 1953 |
| 2,695,520 | Karsai | Nov. 30, 1954 |
| 2,937,676 | Smyser | May 24, 1960 |
| 2,960,130 | Smyser | Nov. 15, 1960 |
| 2,969,096 | Smyser | Jan. 24, 1961 |
| 2,992,675 | Bakke | July 18, 1961 |